Harry G. Yetter
INVENTOR.

United States Patent Office 2,762,285
Patented Sept. 11, 1956

2,762,285

DEFLECTOR FOR A DISC COULTER

Harry G. Yetter, Colchester, Ill.

Original application September 29, 1950, Serial No. 187,581. Divided and this application May 18, 1954, Serial No. 430,566

5 Claims. (Cl. 97—53)

This invention relates to a deflector for a disc coulter and particularly to improvements in apparatus for association with disc coulters and the means for mounting the disc coulter with respect to a plow beam or bar.

This invention is a division of application, Serial No. 187,581, filed September 29, 1950.

Accordingly, an object of the present invention resides in the novel cooperation between the bearing housing of the disc coulter and the bracket for supporting the bearing housing whereby the disc coulter may be angularly adjusted with respect to the bracket coulter shank.

Still another object of the present invention resides in the provision of novel means for deflecting the turf from the periphery of the disc coulter whereby the same will cover the weeds and rubbish on the ground being turned.

Another object of the present invention resides in the provision of a novel deflecting plate which is adapted to be juxtaposed to the concave surface of the disc coulter for deflecting stones and turf therefrom.

A still further object of the present invention resides in the novel provision of means for pivotally supporting a deflector plate with respect to the bracket on the coulter shank whereby the same may pivot upwardly when struck by rocks, and the like.

Still other objects of the present invention are to provide such means that are simple in construction, economical in manufacture, easily assembled and disassembled, and general serviceability.

Various other objects and advantages of the present invention will become apparent from the detailed description to follow. The best forms in which I have contemplated applying my invention are clearly illustrated in the accompanying drawings, wherein:

Figure 2 is a front elevational view of the structure of Figure 1 showing the deflector plate in its normal position and in dotted lines when the plate has been struck by a rock, or the like.

Figure 1:
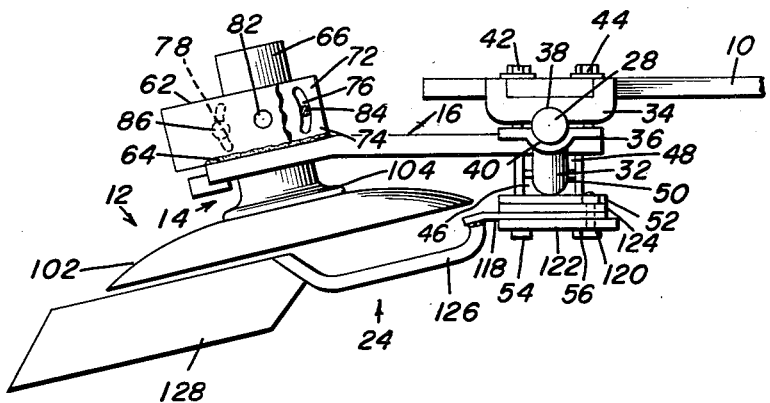
Figure 1 is a top plan view of the disc coulter and attachment showing the deflector plate mounted in juxtaposition to the disc coulter.

Referring more particularly to the drawings, wherein like numerals designate like parts throughout, the numeral 10 designates generally a plow beam or bar to which the disc coulter assembly 12, bearing housing 14, coulter bracket 16, coulter shank 18, and coulter shank attaching means 20 are secured for support. The numeral 24 designates generally the deflector plate assembly for use in conjunction with disc coulter 12.

The plow beam 10 is of any conventional form, preferably being rectangular in cross section. The coulter shank 18 is also of conventional form, having a first upstanding portion 28, a second offset portion 30 extending in parallel relation to the upper portion 28 and a connecting portion 32. The coulter shank 18 is secured to the plow beam 10 by means of a bracket 20.

Figure 2:
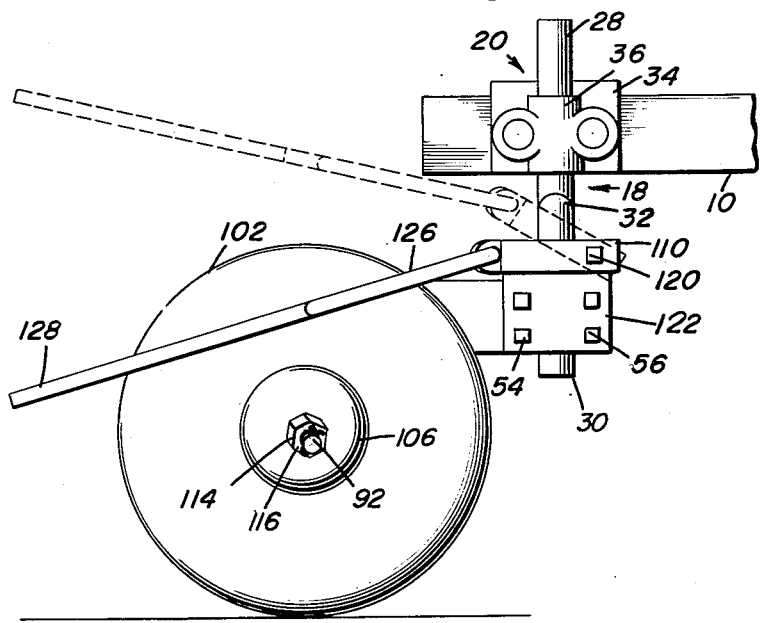

In looking at Figures 1 and 2, the bracket 20 will be seen to comprise a pair of clamping plates 34 and 36 each being provided with a semicylindrical recess 38 and 40, respectively. Bolts 42 and 44 pass through the plow beam 10 and first clamping element 34 is threadedly engaged in the second clamping element 36 whereby the coulter shank 18 will be fixedly secured with respect to the plow beam 10.

Looking now at Figure 1 it will be seen that the means for securing the coulter bracket 16 to the coulter shank 18 includes a pair of jaws 46 and 48 which are formed of serrated substantially semicylindrical recesses 50 for engagement of the lower end 30 of the shank 18. The jaw 48 is integrally secured to the bracket 16 while the jaw 46 is secured to the plate 52. A pair of bolts 54 and 56 extend through the plate 52 and bracket 16 and have nuts threadedly engaged on their outer ends for clamping the jaws 46 and 48 to the coulter shank 18.

The outer end of the bracket 16 is provided with a right angularly extending plate 62 which is welded thereto at 64, as seen in Figure 1. A bearing housing 14 includes a sleeve 66 having an extension plate 72. The upper surface of the plate 72 is flattened as at 74 for positioning against the underside of the plate 62 of the bracket 16.

As best seen in Figure 1, the plate 72 is provided with a pair of elongated arcuated slots 76 and 78 and a central aperture 82 is provided for receiving a bolt. The bolt (not shown) would extend through the plate 62 for fixedly securing the housing 14 with respect to the plate and bracket 16 as desired. Bolts 84 and 86 extend through the plate 62 and arcuated slots 76 and 78, nuts being provided on the underside of the plate 72 for threaded engagement on the shanks of the bolts 84 and 86 for fixedly securing the plate 72 to the plate 62 in the desired angular relation.

Referring once again to the bearing housing 14, it will be seen that the shaft 92 on the disc coulter assembly 12 is journaled in the sleeve 66. A nut 114 is threaded on the outer end of the shaft 92 with a cotter pin 116 extending through the outer end of the shaft 92.

The disc coulter assembly 12 includes the concave disc 102, clamping plates 104 and 106 on opposite sides of the disc 102, the disc and clamping plates being disposed on the shaft 92. The nut 114 and cotter pin 116 on the outer end of the shaft 92 complete the disc assembly. The deflector plate assembly 24 includes a pivot mounting arm 118 which is pivotally mounted on the pin 120 extending through a pair of plates 122 and 124 which are secured to the plate 52 of the clamping means for securing the bracket 16 to the coulter shank 18. The arm 126 is welded to the outer end of the pivot element 118 and has its outer end integrally secured to an elongated deflector plate 128. The arm 126 and plate 128 lie substantially in the same plane and are in angulated relation to the pivot element 118, whereby the deflector plate will lie across the concave face of the disc 102. It will thus be seen that as the disc coulter travels at a higher rate of speed through the ground, the turf and rocks which strike the deflector plate will deflect it to the position shown in dotted lines and also cause the turf and rocks to be deflected onto the surrounding ground.

From the foregoing description taken in conjunction with the drawings, I believe that means have been provided which will accomplish all the objects hereinbefore set forth.

What is claimed as new is as follows:

1. In a disc coulter assembly of the type having a concave coulter disc and an elongated mounting bracket, said coulter disc being journaled on said mounting bracket; a pair of clamping jaws, one of said jaws being rigidly connected to said bracket, a clamping plate connected to the other of said jaws, a horizontal pivot pin mounted on said clamping plate, a pivot element pivotally mounted on said horizontal pivot pin, said pivot element having free limited vertical movement, an arm secured to said pivot member and extending in angular relation thereto, a flat deflector plate mounted on said arm, said deflector plate extending in proximity with the upper portion of the concave face of said coulter disc.

2. A disc coulter assembly comprising a shank adapted to be mounted on a plow beam, a clamp adjustably mounted on said shank, an elongated bracket rigidly secured to said clamp, a mounting plate secured on said bracket, a bearing housing adjustably mounted on said plate, a concave coulter disc journaled in said bearing, a pivot arm pivotally mounted on said clamp, said arm having free limited vertical movement about said clamp, a flat deflector plate mounted on said arm and disposed in proximity with the upper rear portion of the concave face of said disc.

3. A disc coulter assembly comprising a mounting clamp, a mounting bracket rigidly secured on said clamp, a concave coulter disc journaled on said bracket in spaced relation to said clamp, an arm freely pivotally mounted on said clamp, a flat deflector plate mounted on said arm and disposed adjacent the upper concave face of said disc at the edge remote from said clamp.

4. A disc coulter apparatus comprising a downwardly extending disc coulter shank adapted to be attached to a plow bar, a disc coulter bracket assembly secured adjacent the lower end of said shank, a concave coulter disc carried by said bracket assembly, a flat elongated deflector plate mounted for free upward movement and downward movement in juxtaposition to the upper rear portion of the concave face of the disc coulter, said plate being pivotally secured on the end of the disc coulter bracket assembly adjacent the coulter shank.

5. In a disc coulter apparatus of the type having a downwardly extending disc coulter shank adapted to be attached to a plow bar, a disc coulter bracket assembly secured adjacent the lower end of said shank, a shaft carried by said bracket assembly, a disc coulter having a concave face attached to said shaft, a flat elongated deflector plate mounted for free upward movement and downward movement in juxtaposition to the upper rear portion of the concave face of said disc coulter, said plate being pivotally secured on the end of the disc coulter bracket assembly adjacent the coulter shank.

References Cited in the file of this patent

UNITED STATES PATENTS

| | | |
|---|---|---|
| 300,688 | Brother et al. | June 17, 1884 |
| 795,430 | Danielsen | July 25, 1905 |
| 941,191 | Ditmar | Nov. 23, 1909 |
| 944,478 | Brown | Dec. 28, 1909 |
| 1,273,898 | Melvin et al. | July 30, 1918 |
| 1,360,531 | Hyatt | Nov. 30, 1920 |
| 1,698,611 | Teague et al. | Jan. 8, 1929 |
| 1,811,232 | Gilson | June 23, 1931 |